United States Patent [19]

Hane

[11] Patent Number: 5,358,395

[45] Date of Patent: Oct. 25, 1994

[54] FRAME ASSEMBLY FOR MOLD FOR EXPANSION MOLDING

[76] Inventor: Takao Hane, 4-603, Kusunoki-ajima, Kita-ku, Nagoya-shi, Aichi, Japan

[21] Appl. No.: 166,349

[22] Filed: Dec. 10, 1993

Related U.S. Application Data

[63] Continuation-in-part of Ser. No. 909,023, Jul. 6, 1992, abandoned.

[30] Foreign Application Priority Data

Sep. 3, 1991 [JP] Japan .................. 3-253041

[51] Int. Cl.5 .................. B29C 33/40; B29C 37/00
[52] U.S. Cl. .................. 425/4 R; 249/139; 249/205; 425/186; 425/190; 425/192 R; 425/817 R
[58] Field of Search .............. 249/134, 135, 139, 120, 249/194, 48, 160, 168, 163, 165, 164, 205; 425/4 R, 186, 192 R, 195, 190, 451.9, 817 R, 188, 451

[56] References Cited

U.S. PATENT DOCUMENTS

| | | | |
|---|---|---|---|
| 2,411,862 | 12/1946 | Arnold | 249/168 |
| 3,021,586 | 2/1962 | Uruburn | 249/165 |
| 3,288,427 | 11/1966 | Pluckebaum | 249/194 |
| 4,174,089 | 11/1979 | Kienow et al. | 425/4 R |
| 4,239,176 | 12/1980 | Salazar | 249/168 |
| 4,382,757 | 5/1983 | Roy et al. | 425/4 R |
| 4,813,859 | 3/1989 | Bullard et al. | 425/4 R |
| 4,888,252 | 12/1989 | Kilim | 249/135 |

FOREIGN PATENT DOCUMENTS

203156  5/1959  Austria .................. 249/163

*Primary Examiner*—Khanh Nguyen
*Attorney, Agent, or Firm*—Flynn, Thiel, Boutell & Tanis

[57] ABSTRACT

A frame for supporting a mold for use in manufacturing a product from expanded polystyrene. The frame includes angled corner locking members having longitudinally projecting guide portions located at each end, and longitudinal side members having longitudinally projecting complementary guide portions located at each end. The guide portions and the complementary guide portions are adapted to slidably interfit with one another to form an interlocked engagement. The angled corner locking members and the longitudinal side portions further include recessed portions located on interior facing walls for supporting the mold on the frame.

21 Claims, 8 Drawing Sheets

FRAME ASSEMBLY FOR MOLD FOR EXPANSION MOLDING

This application is a continuation-in-part of U.S. Ser. No. 07/909,023 filed Jul. 6, 1992 now abandoned.

BACKGROUND OF THE INVENTION

1. Field of the Invention

This invent ion relates to an improvement in a frame assembly for a mold for expansion molding, particularly for a mold for molding of expanded polystyrene.

2. Statement of Prior Art

The mold for molding of expanded polystyrene to be mounted on an automatic molding machine is generally composed of a set of a concave stationary side part (cavity part) and a convex moving side part (core part), which are disposed opposedly, having respective frames fitted at the opposite sides thereof with backplates, to form a steam chamber inside.

Figure 5:
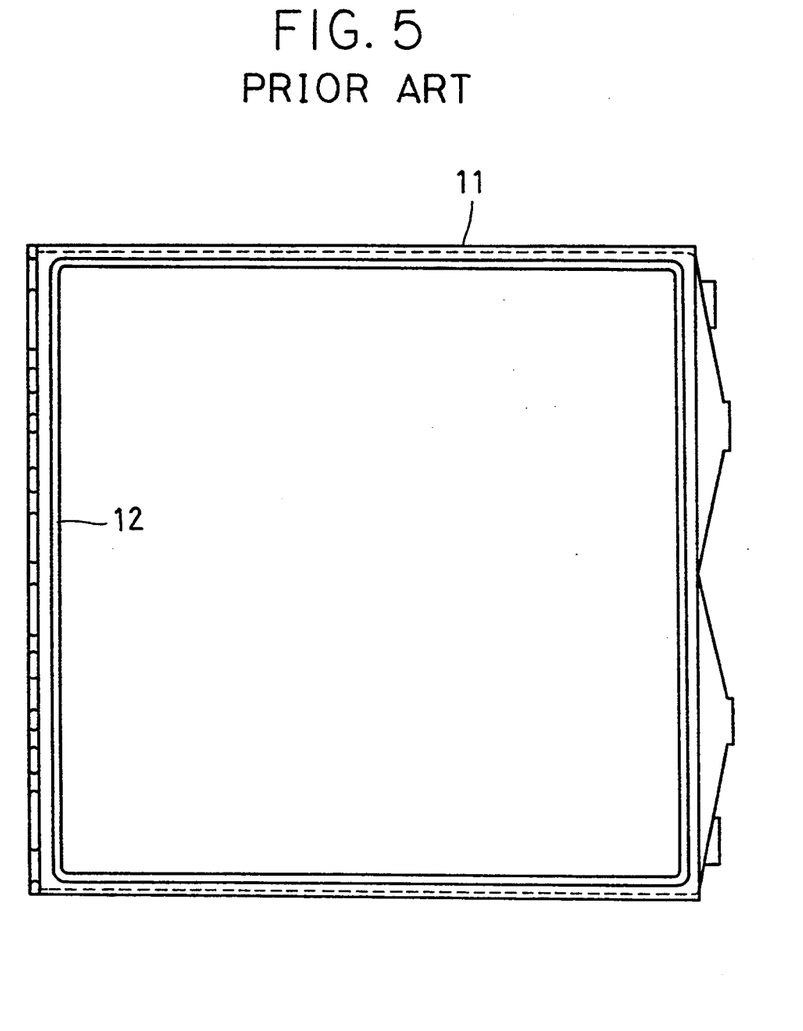
FIG. 5 is a top plan view showing one example of a prior art frame for mold.

One example of conventional frames for a mold of the kind stated above is shown in FIG. 5 in which a plurality of plates (11) (12) are cast from aluminum alloy and united together by welding to form a square frame. Another example includes a one-piece frame fashioned by casting of aluminum alloy.

However, manufacturing the one-piece frame made of cast aluminum alloy and the frame united by welding of cast plates stated above are problematic in that the casting process is complicated, expensive, and time consuming. In altering the production of moldings where the shape of the moldings and the cavity number per one mold are changed, respective frames suited to the respective molds have to be provided, which is extremely uneconomical. Furthermore, the existing frames are prone to cause diminution of strength attended by blemish of castings or deterioration of castings upon welding, and consequently, there is a problem in long-term use.

SUMMARY OF THE INVENTION

In order to overcome the present state of art in the light of the problems above, this invention has been accomplished by finding the construction of a mold frame by fitting and assembling works and the utilization of a profile material formed by extrusion fabrication of light alloy.

A primary object of this invention is therefore to provide such a mold frame that enables the simplification in working it as well as the significant reduction of the working cost and the reduction of the working period, thereby shortening the delivery time of foam moldings in their manufacture and reducing their manufacturing cost.

Another object of this invention is to provide a mold frame for making it easy to accommodate the alteration of size of moldings and cavity number per one mold by replacement with another profile members of a desired length preliminarily prepared.

The invention for attaining the foregoing objects resides in the construction of a frame assembly for a mold which comprises corner locking members each having mating portions for coupling at both ends and profile members of a required length, the profile members being configured by extrusion fabrication of a light alloy such as aluminum to have corresponding profiled shape to the mating portions of the corner locking members, both the corner locking members and the profile members being coupled by fitting of the end portions to one another to form a frame shape and further clamped and secured by fastening means such as bolts at the fitted, linked portions.

The above-mentioned corner locking member can be fashioned by extrusion fabrication or casting fabrication of a light alloy such as aluminum alloy.

The above-mentioned profile member configured by extrusion molding may be cored in its inside, thereby to enhance economy and thermal insulation effect.

According to the frame assembly for a mold with which this invention is concerned, if only the profile members having the contoured shape suited to the shape of mating portions for coupling of the corner locking members are fashioned by extrusion fabrication of a light alloy, e.g. alloy of aluminum, it is possible to make readily a mold frame only by fitting and coupling the profile members cut in a required length to the locking members and clamping and securing the fitted and coupled portions with fastening means, e.g. adhesive or bolts.

Where the size of moldings or the cavity number per one mold is changed, it is also possible to accommodate easily the change since a frame can be assembled only by altering the length of the profile members of light alloy in conformity with the size or cavity number to be changed.

In case where the profile members are cored or hollow, saving of material is enabled and handling property upon working is improved.

DESCRIPTION OF THE PREFERRED EMBODIMENTS

The preferred embodiments of this invention will be hereinbelow described with reference to the accompanying drawings.

Figure 1:
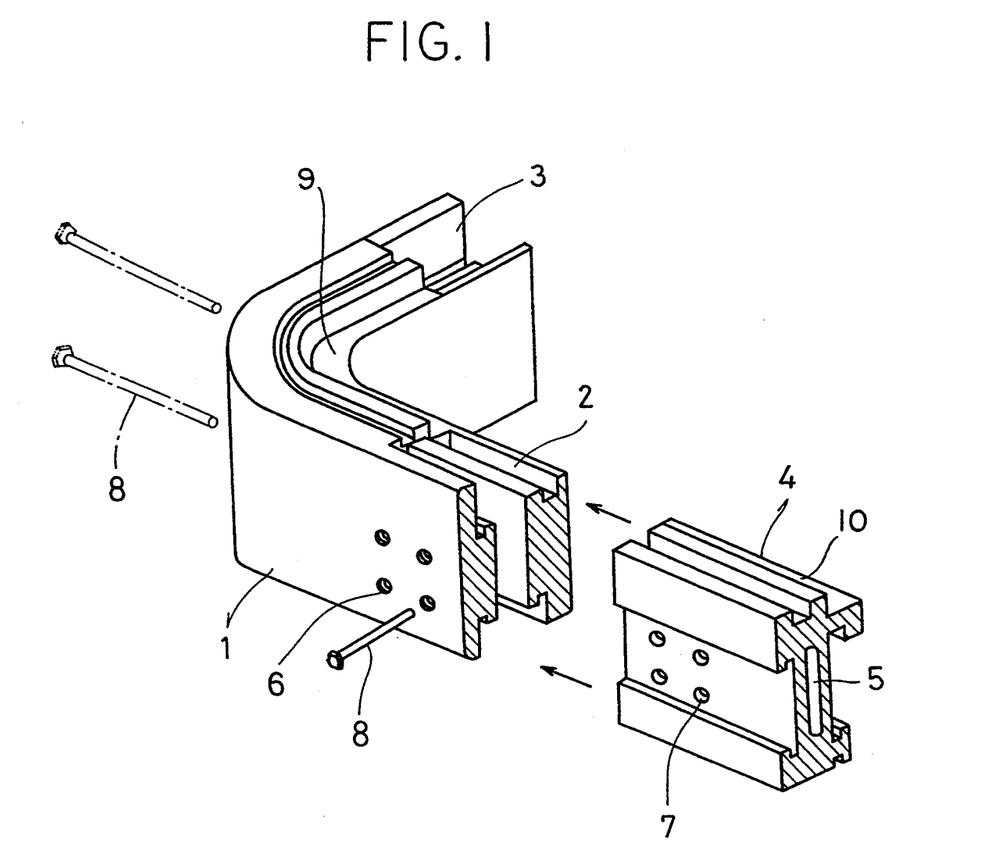
FIG. 1 is a schematic view showing one example of a constituent element of a frame assembly pertaining to this invention.
Figure 2A:
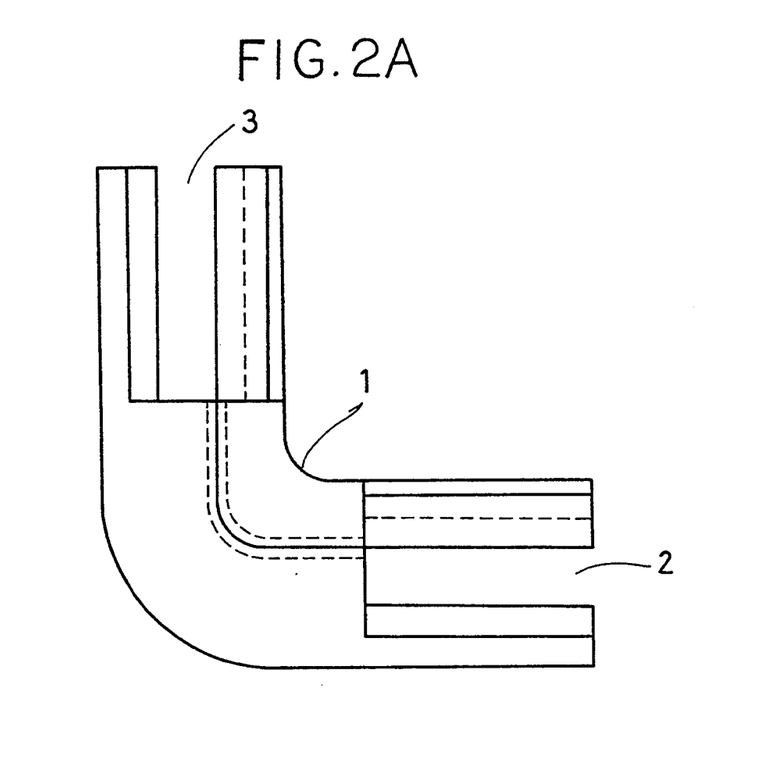
FIG. 2A and FIG. 2B are diagrammatic views each showing a coupling portion of a corner locking member in the case of stationary side mold part, with FIG. 2A and FIG. 2B being a top plan view and a right-hand elevational view, respectively.
Figure 2B:
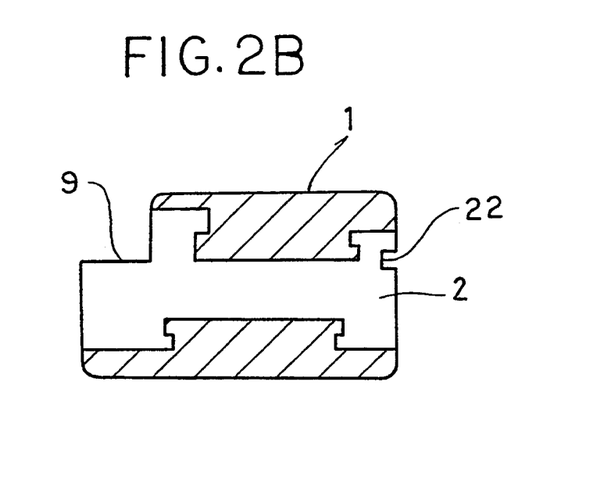
Figure 3A:
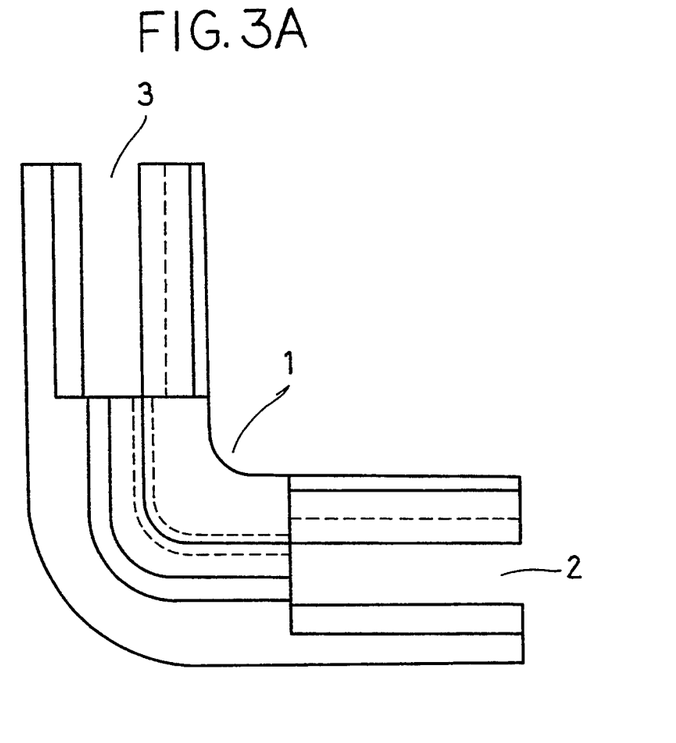
FIG. 3A and FIG. 3B are diagrammatic views each showing a coupling portion of a corner locking member in the case of a moving side mold part, with FIG. 3A and FIG. 3B being a top plan view and a right-hand elevational view, respectively.
Figure 3B:
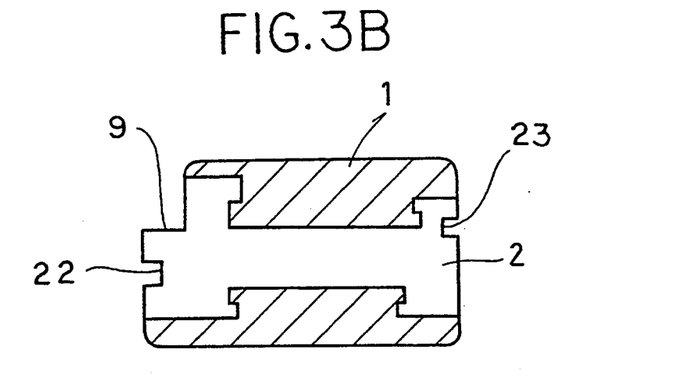

Referring to FIG. 1, a corner locking member 1 and a profile, or side member 4 which is to be fitted to and set up with the corner locking member 1 are illustrated schematically, which constitute substantial elements of a frame for mold pertaining to this invention. The corner locking member 1 assumes a shape suited to the corner part of a frame for mold, for example, an arc-like curved L-shape or angled shape as viewed and is formed at both ends thereof with mating portions 2,3 for fitting and coupling them to the profile members 4.

The corner locking member 1 may be fashioned by casting fabrication of a light alloy or other metal, or by extrusion fabrication of a light alloy, e.g. typically aluminum alloy.

On the other hand, the profile member 4 is engaged and coupled to the corner locking member 1, thus forming a side part of a frame assembly for mold and is configured in a contoured shape capable of fitting to the mating portions 2,3 for coupling of the corner locking member 1 by extrusion fabrication of light alloy, e.g. aluminum alloy.

The profile member 4 is fashioned as sections of continuous length having the same contoured shape in the elongated direction because it is produced by extrusion fabrication of light alloy such as aluminum alloy or the like. In use, the section material is cut to profile members 4 in conformity with a required length of a mold frame. Here, the contoured shape of the profile member 4 is not limited to the example as illustrated if only it matches the contoured shape of the mating portions 2,3 of the corner locking member 1 so that the profile members 4 and the corner locking member 1 can fit to one another.

Figure 7A:
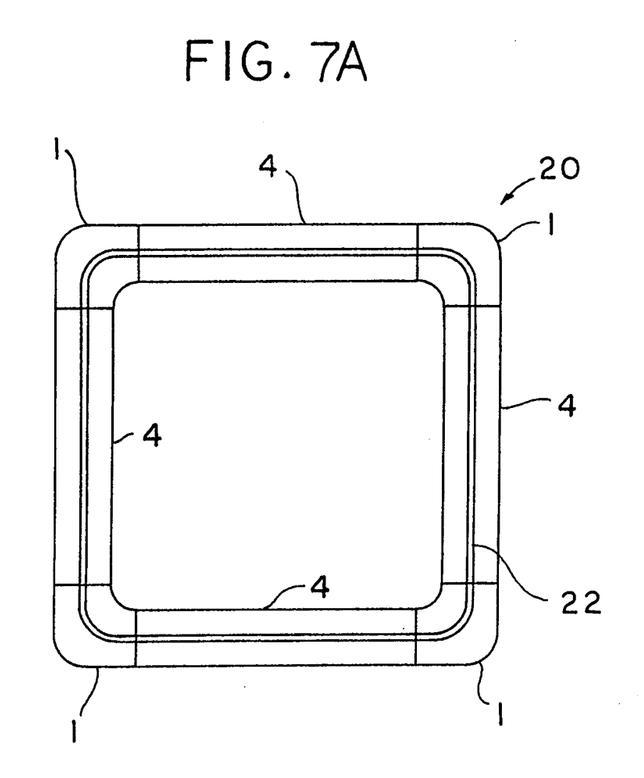
Figure 7B:
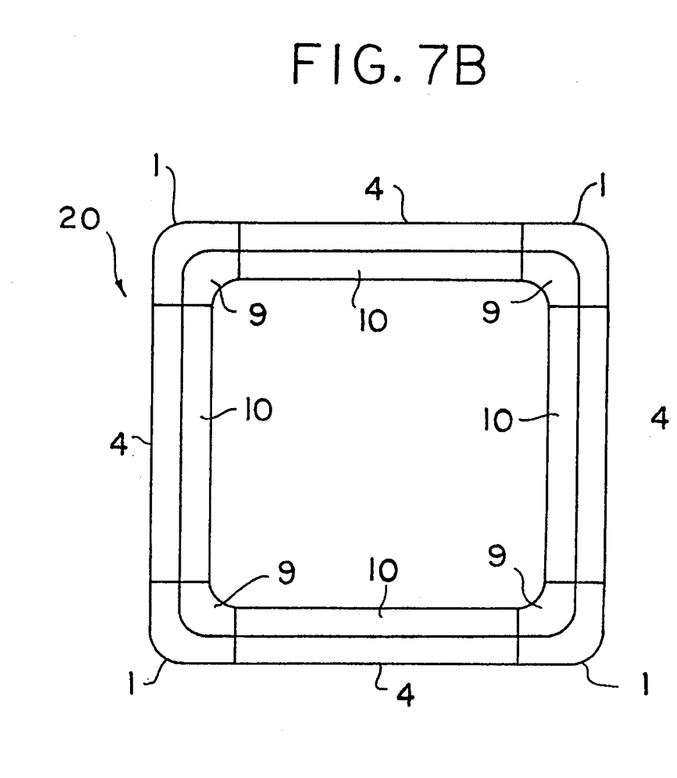
Figure 8A:
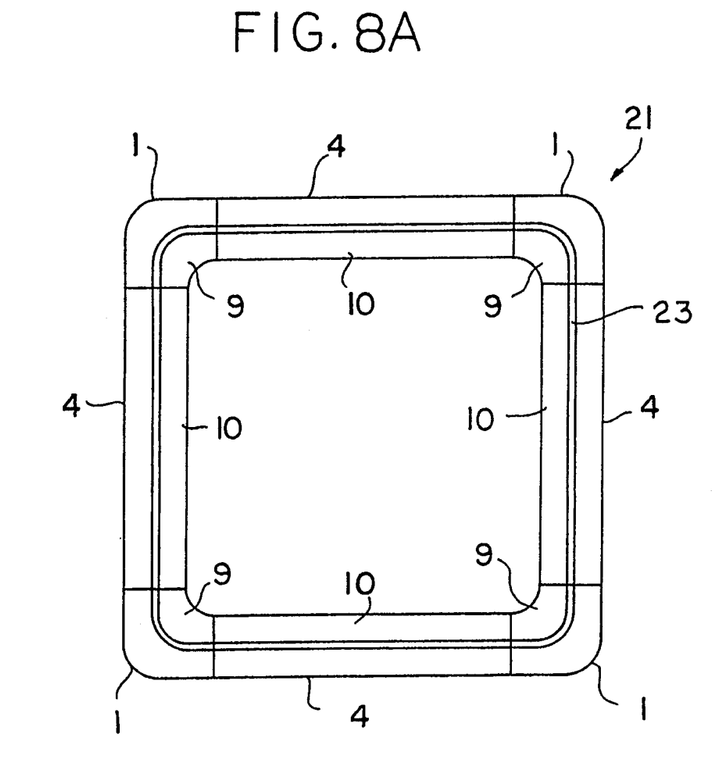
Figure 8B:
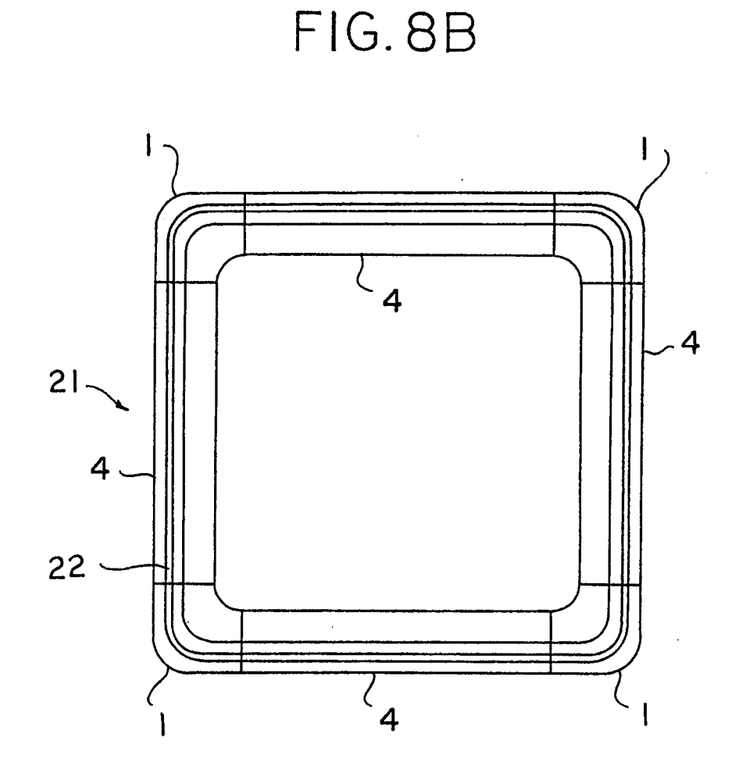

The profile member 4 may be of a solid body, but preferably can be cored with a hollow part or bore 5 as illustrated, from the aspect of weight saving and thermal insulation. FIGS. 7 and 8 illustrate the case of a square frame for a mold wherein the corner locking members 1 are arranged to form four corners of a frame and the profile members 4 of light alloy are coupled between the respective corner locking members 1, with the end portions of both members 1,4 fitted to one another.

In assembling, in order to further strengthen the fitting and coupling between the corner locking members 1 and the profile member of light alloy 4, bolt holes 6 and 7 are perforated at the respective members 1 and 4 to insert bolts 8 therethrough in the lateral direction, i.e. perpendicularly to the fitting direction of both members or in the parallel direction to the fitting direction whereby the fitted portions of both members are firmly secured.

Figure 6:
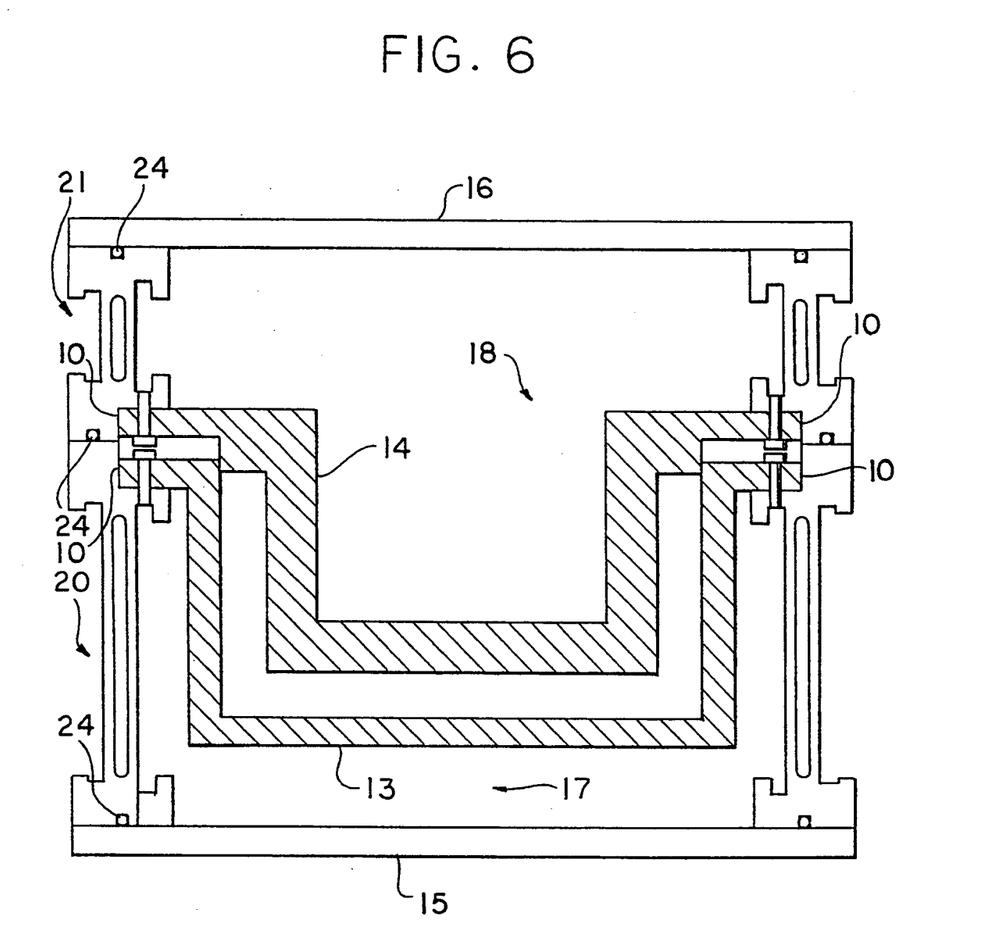
FIG. 6 is a sectional view of the frame assembly.

Referring now to FIG. 6, a mold is composed of a set of a stationary side cavity part 13 and a moving side core part 14. The types of a frame for cavity part and a frame for core part are not always the same and may be different from each other depending upon the intended objects. Thus, there are two frames 20 and 21 used for a cavity part 13 and a core part 14, respectively which are somewhat different in the shape. By the same token, in this invention, the corner locking members 1 and the profile members 4 are adopted which have different corresponding contoured shapes at the respective fit portions between the frames for cavity part and core part.

FIGS. 2A, 2B and 3A, 3B show examples of corner locking members 1 used for a stationary cavity part 13 and moving core part 14, respectively. Each corner locking member 1 includes an interior facing recessed portion 9 for supporting the respective mold part.

Figure 4A:
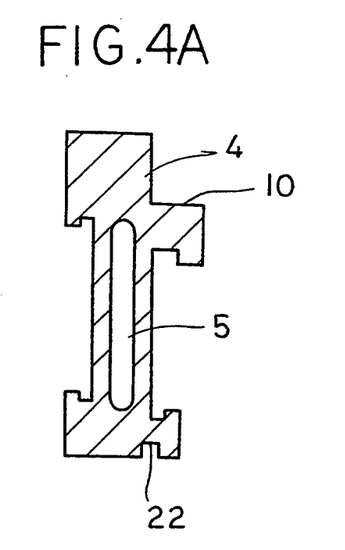
FIG. 4A and FIG. 4B are cross-sectional views of one example of a profile member, with FIG. 4A and FIG. 4B showing the cases of a stationary side mold part and moving side mold part, respectively.
Figure 4B:
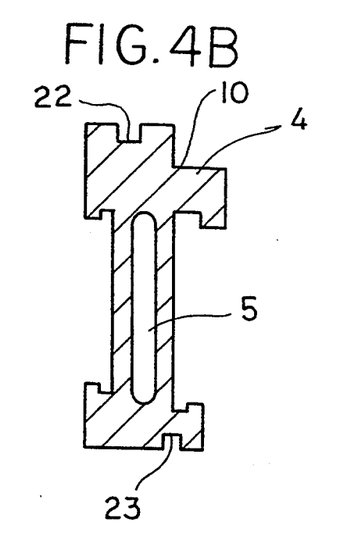

FIGS. 4A and 4B are examples showing profiled cross-sections of profile members 4, with FIG. 4A showing a profile member used for the construction of a frame 20 for a stationary side cavity part 13. FIGS. 7a and 7b are examples showing a frame for a stationary side cavity part. FIG. 4B shows a profile member used for the construction of a frame 21 for a moving side core part 14. FIGS. 8a and 8b are examples showing a frame for a moving side core part. Each profile members includes a longitudinally extending recessed portion 10 for supporting the respective mold part.

In this manner, each frame assembly of this invention is constructed.

To the respective recessed portions 9 and 10 are attached the cavity part 13 and the core part 14 on the obverse side and are attached backplates 15 and 16, respectively on the reverse side, thus forming a steam rooms 17 and 18, respectively inside. The corner locking members 1 and profile members 4 can optionally include packing grooves or channels 22 on outer surfaces thereof contacting the back plates 15 and 16. Additionally, the corner locking member 1 and the profile members 4, which are assembled to form one of, or both frames 20 and 21 can optionally include packing grooves or channels 23 on the mutually abutting inner surfaces thereof. The packing grooves 22 and 23 can retain any type of convention a packing or sealing material 24 for use in sealing the steam chambers 17 and 18. Expansion molding is usually effected as follows: Polystyrene beads are filled through a feedstock filling machine into a cavity part and steam is introduced into the steam room for heating. After discharge of drain, cooling water is introduced into the mold to cool it and thereafter, the mold is opened to release expanded moldings. At this time, the location of the feedstock filling machine and the number of ejector pins for mold releasing vary depending upon the kind of moldings.

In this case, according to conventional method, another frame provided beforehand was replaced and it was difficult to adjust the replaced frame. Conversely, in this invention it is easy to change the frame because of the use of a profile material formed by extrusion fabrication, since the profile material is only cut in a required length into profile members 4 which are, in turn, combined with the corner locking members 1 and coupled by fitting, whereby the working efficiency of expansion molding can be enhanced. Since the assembling cost is inexpensive, it is also possible to diminish and curtail the replacement work by preparing for various spare profile members and preliminarily setting molds.

Thus far described, this invention provides a frame for mold which is formed by combining corner locking members having mating portions for coupling at both ends and profile members of light alloy having a required length, the profile members being configured to match the contoured shape of the mating portions of corner locking members by extrusion fabrication of light alloy and by fitting and coupling the terminal portions of both members to one another. As a consequence, as compared with prior art frames of integral one-piece castings of aluminum or ones united by welding of a plurality of cast molded plates of aluminum alloy, it is possible to make easily a frame for mold only by cutting a profile material at an optional length corresponding to the frame and combining the cut profile members with corner locking members. Hence, the frame for mold is extremely easy and simple to assemble and can be readily accommodated to the change of specification such as the size of moldings, the cavity number per one mold, etc., and consequently, the assembling of the frame for mold affords a good working efficiency as well as economical advantage. In particular, since the frame assembly of this invention does away with the necessity of welding process and can be readily constructed only by assembling work, it can be produced unexpensively; since its coupled portions are fortified by bolts or any other means such as an adhesive, sufficient strength and high dimensional accuracy can be obtained and the frame assembly is thus highly useful as a frame for mold for expansion molding.

In case where the profile members are cored, weight saving and saving of materials can be attained.

What is claimed is:

1. A frame for supporting a mold used in manufacturing a product from expanded polystyrene, said frame comprising:

a plurality of angled corner members each having a pair of diverging legs and a first contoured guide means on each leg thereof, and first attaching means for facilitating a securing of said mold to said frame;

a plurality of longitudinal side members having second contoured guide means on each end thereof conforming with said first contoured guide means for slidably interfitting with said first guide means on mutually adjacent corner members, each said adjacent first and second guide means interfitting together to define an interlocked engagement therebetween constraining relative movement to a back and forth movement along a single axis, each said corner member and side member, when coupled together by said interlocked engagement, respectively forming said frame, said longitudinal side members further including second attaching means for facilitating a securing of said mold to said frame; and fastening means for fixedly securing said first guide means and said second guide means in said interlocked engagement to prevent said relative back and forth movement.

2. The frame as claimed in claim 1, wherein said first contoured guide means and said second contoured guide means extend longitudinally of said legs and said ends, respectively, and telescopingly slide one onto the other to effect said interfitted, interlocking engagement.

3. The frame as claimed in claim 1, wherein said first and second attaching means include recessed portions extending longitudinally along an interior wall of said angled corner members and said longitudinal side members, respectively, for supporting said mold on said frame.

4. The frame as claimed in claim 1, wherein said fastening means includes at least one bolt for insertion into a plurality of registered apertures in said first and second guide means.

5. The frame as claimed in claim 1, wherein said corner members and said side members are fabricated by extrusion of an aluminum alloy.

6. The frame as claimed in claim 1, wherein said corner members and said side members are fabricated by casting of an aluminum alloy.

7. A frame assembly for supporting a mold for use in manufacturing a product from expanded polystyrene, said mold including a first mold member having a surface which defines a portion of said product, and a second mold member having a surface which defines another portion of said product, said surfaces cooperating to define an enclosed cavity representing boundaries of said product, said frame assembly comprising:

a first frame having first and second walls fixedly supporting a first backplate and said first mold member, respectively;

a second frame having third and fourth walls fixedly supporting said second mold member and a second backplate, respectively, said first and second frames abutting along said second wall of said first member and said third wall of said second member so that said first and second mold member surfaces are oriented to define said enclosed cavity therebetween;

said first and second frames each including a plurality of angled corner locking members having a pair of diverging legs and a contoured mating portion extending along a longitudinal axis of each said leg at an end thereof, and an interior facing wall having a longitudinally extending recessed portion;

a plurality of profile members, each extending between mutually adjacent corner locking members and having complementary mating portions extending along a longitudinal axis of said profile members at each end thereof, said complementary mating portions conforming with said contoured mating portions for slidably interfitting with said contoured mating portions on said mutually adjacent corner locking members, each said adjacent contoured mating portion and complementary mating portion interfitting together to define an interlocked engagement constraining relative movement to a back and forth movement along a single axis, said plurality of profile members further including an interior facing wall having a longitudinally extending recessed portion, said recessed portions of said corner locking members and said profile members supporting said respective mold members therein; and fastening means for fixedly securing said corner locking members and said profile members together when said contoured mating portions and said complementary mating portions are in said interlocked engagement to prevent said relative back and forth movement.

8. The frame assembly as claimed in claim 7, wherein said contoured mating portions and said complementary mating portions each extend longitudinally of said respective end wall means and telescopingly slide one onto the other to effect said interfitted, interlocked engagement.

9. The frame assembly as claimed in claim 7, wherein said profile members further include a central bore extending through and along said longitudinal axis for reducing the weight of said frame.

10. The frame assembly as claimed in claim 7, wherein said corner locking members are fabricated by extrusion of a light alloy.

11. The frame assembly as claimed in claim 10, wherein said light alloy is an aluminum alloy.

12. The frame assembly as claimed in claim 7, wherein said corner locking members are fabricated by casting of a light alloy.

13. The frame assembly as claimed in claim 12, wherein said light alloy is an aluminum alloy.

14. The frame assembly as claimed in claim 7, wherein said profile members are fabricated by extrusion of a light alloy.

15. The frame assembly as claimed in claim 14, wherein said light alloy is an aluminum alloy.

16. The frame assembly as claimed in claim 7, wherein said profile members are fabricated by casting of a light alloy.

17. The frame assembly as claimed in claim 16, wherein said light alloy is an aluminum alloy.

18. The frame assembly as claimed in claim 7, wherein said fastening means includes at least one bolt for insertion into a plurality of registered apertures in said mating portions.

19. The frame assembly as claimed in claim 7, wherein said fastening means is an adhesive.

20. The frame assembly as claimed in claim 7, wherein said first frame, said first molding member and said first backplate cooperate to form a first steam chamber, and said second frame, said second molding member and said second backplate cooperate to form a second steam chamber, wherein said steam chambers retain steam for heating said mold members, respectively.

21. The frame assembly as claimed in claim 7, wherein said first and fourth walls and at least one of said second and third walls include a packing groove formed respectively therein, each said packing groove retaining a packing material.

* * * * *